US012614917B2

(12) United States Patent
Li

(10) Patent No.: US 12,614,917 B2
(45) Date of Patent: Apr. 28, 2026

(54) DEVICE TO BE CHARGED COMPATIBLE WITH MULTIPLE CHARGING SOLUTIONS, AND CHARGING METHOD THEREFOR

(71) Applicant: GUANGDONG OPPO MOBILE TELECOMMUNICATIONS CORP., LTD., Dongguan (CN)

(72) Inventor: Zhijie Li, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 1104 days.

(21) Appl. No.: 17/575,484

(22) Filed: Jan. 13, 2022

(65) Prior Publication Data

US 2022/0140640 A1    May 5, 2022

Related U.S. Application Data

(63) Continuation of application No. PCT/CN2020/120932, filed on Oct. 14, 2020.

(30) Foreign Application Priority Data

Oct. 16, 2019    (CN) .......................... 201910984920.4

(51) Int. Cl.
*H02J 7/00* (2006.01)

(52) U.S. Cl.
CPC .... *H02J 7/007194* (2020.01); *H02J 7/00045* (2020.01); *H02J 7/00714* (2020.01); *H02J 7/007182* (2020.01)

(58) Field of Classification Search
CPC ................................................. H02J 7/007194
(Continued)

(56) References Cited

U.S. PATENT DOCUMENTS 5,744,937 A    4/1998  Cheon
7,705,565 B2 *  4/2010  Patino ................. H01M 10/486
                                                                320/108
(Continued)

FOREIGN PATENT DOCUMENTS

CN         106537719 A      3/2017
CN         107231013 A      10/2017
(Continued)

OTHER PUBLICATIONS

Extended European Search Report for EP Application 20875911.8 mailed May 30, 2023. (8 pages).
(Continued)

*Primary Examiner* — Yalkew Fantu
(74) *Attorney, Agent, or Firm* — Young Basile Hanlon & MacFarlane, P.C.

(57) ABSTRACT

Provided are a to-be-charged device and a charging method. The method includes: identifying a type of a power supply device connected to the to-be-charged device through a charging interface of the to-be-charged device; in response to the type being a first type, controlling the battery unit to be charged in a first charging mode through the first charging circuit; and in response to the type being a second type, controlling the battery unit to be charged in a second charging mode through the first charging circuit; wherein a maximum output power of the power supply device of the first type is greater than a maximum output power of the power supply device of the second type; a maximum charging current of the battery unit in the first charging mode is greater than a maximum charging current of the battery unit in the second charging mode.

20 Claims, 5 Drawing Sheets

(58) Field of Classification Search
  USPC ......................................................... 320/106
  See application file for complete search history.

(56) References Cited

U.S. PATENT DOCUMENTS

| | | | | |
|---|---|---|---|---|
| 2004/0113585 A1* | 6/2004 | Stanesti | .................... | H02J 7/02 |
| | | | | 320/116 |
| 2008/0309284 A1* | 12/2008 | Choksi | ............... | H02J 7/00041 |
| | | | | 320/162 |
| 2012/0194124 A1* | 8/2012 | Toivola | .................... | G06F 1/26 |
| | | | | 320/108 |
| 2015/0180249 A1 | 6/2015 | Jeon et al. | | |

FOREIGN PATENT DOCUMENTS

| | | | |
|---|---|---|---|
| CN | 107947252 A | 4/2018 | |
| CN | 109412240 A | 3/2019 | |
| EP | 0982829 A2 | 3/2000 | |
| EP | 3340422 A1 | 6/2018 | |
| EP | 3706282 A1 | 9/2020 | |
| WO | 2018053901 A1 | 3/2018 | |
| WO | 2018184564 A1 | 10/2018 | |

OTHER PUBLICATIONS

Li Chaoqing et al., New Power IC Technical Manual, Section 10.7, Beihang University Press, Publication dated Oct. 31, 2012, 27 pages.

Chinese Rejection Decision with English translation, Chinese Application No. 201910984920.4, mailed Oct. 30, 2024, 29 pages.

Chinese Second Office Action with English translation for Chinese Application No. 201910984920.4, mailed Aug. 7, 2024, 24 pages.

Chinese First Office Action with English Translation for CN Application 201910984920.4 mailed Oct. 22, 2023. (16 pages).

International search report with English Translation for PCT/CN2020/120932 mailed Aug. 1, 2021 (14 pages).

* cited by examiner

10

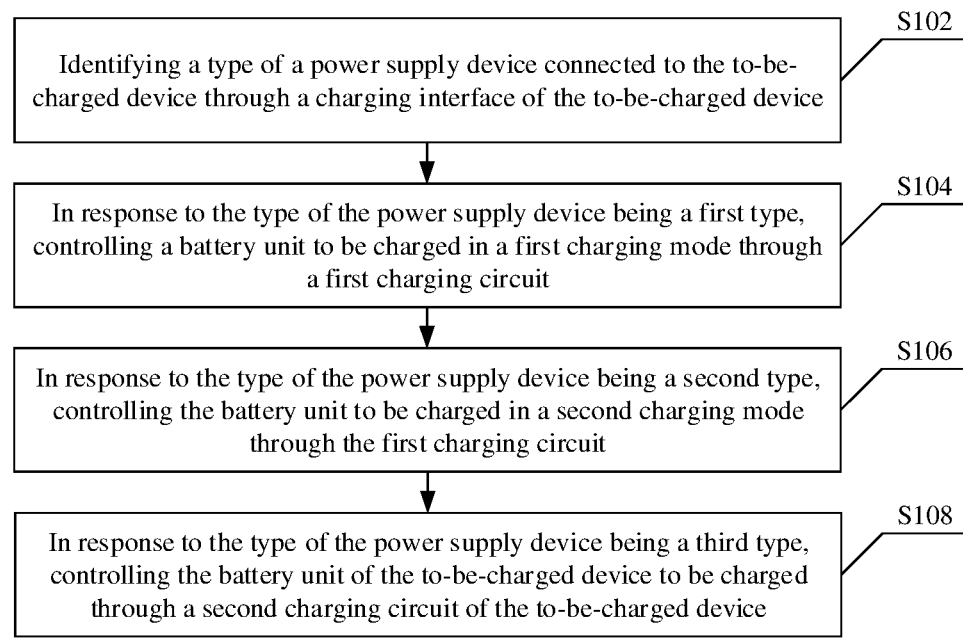

| | S102 |
|---|---|
| Identifying a type of a power supply device connected to the to-be-charged device through a charging interface of the to-be-charged device | |

| | S104 |
|---|---|
| In response to the type of the power supply device being a first type, controlling a battery unit to be charged in a first charging mode through a first charging circuit | |

| | S106 |
|---|---|
| In response to the type of the power supply device being a second type, controlling the battery unit to be charged in a second charging mode through the first charging circuit | |

| | S108 |
|---|---|
| In response to the type of the power supply device being a third type, controlling the battery unit of the to-be-charged device to be charged through a second charging circuit of the to-be-charged device | |

FIG. 3

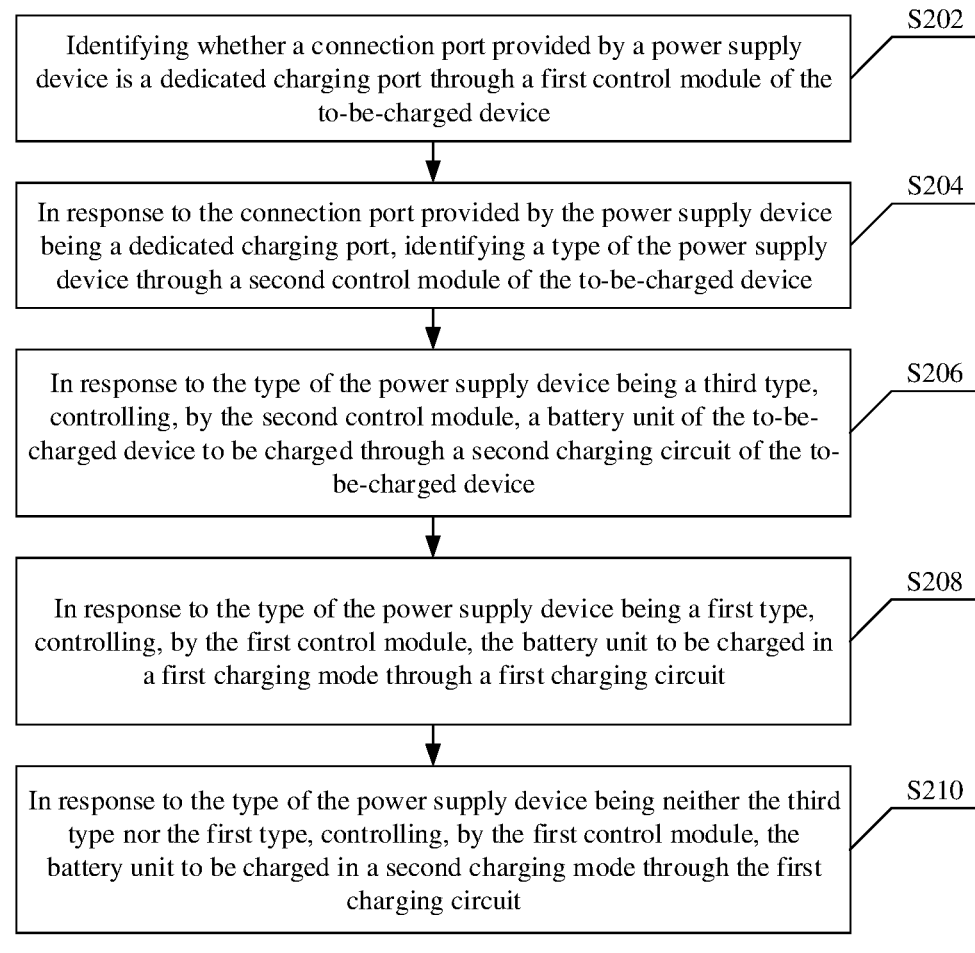

20

| | |
|---|---|
| Identifying whether a connection port provided by a power supply device is a dedicated charging port through a first control module of the to-be-charged device | S202 |
| In response to the connection port provided by the power supply device being a dedicated charging port, identifying a type of the power supply device through a second control module of the to-be-charged device | S204 |
| In response to the type of the power supply device being a third type, controlling, by the second control module, a battery unit of the to-be-charged device to be charged through a second charging circuit of the to-be-charged device | S206 |
| In response to the type of the power supply device being a first type, controlling, by the first control module, the battery unit to be charged in a first charging mode through a first charging circuit | S208 |
| In response to the type of the power supply device being neither the third type nor the first type, controlling, by the first control module, the battery unit to be charged in a second charging mode through the first charging circuit | S210 |

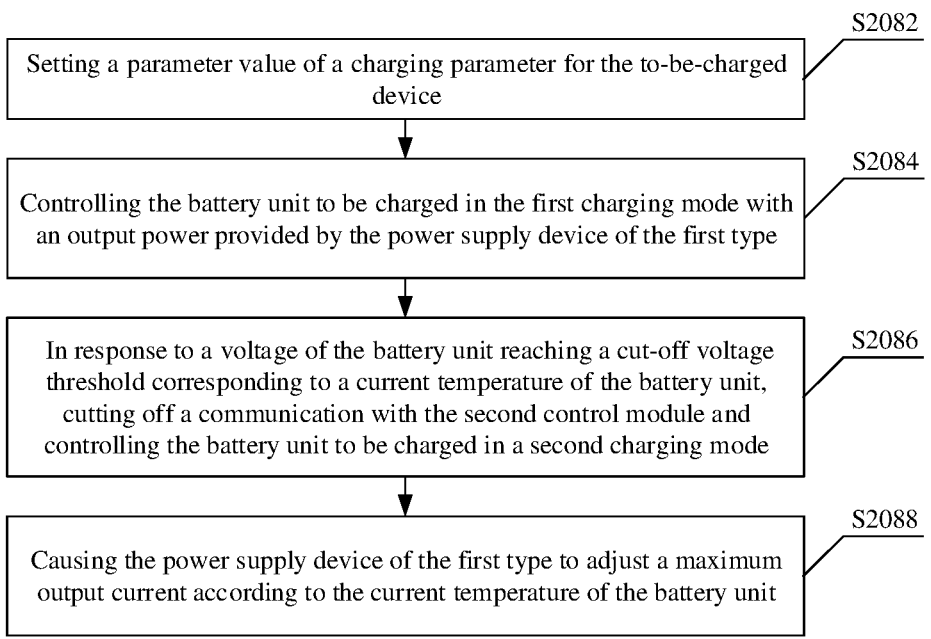

S2082

Setting a parameter value of a charging parameter for the to-be-charged device

S2084

Controlling the battery unit to be charged in the first charging mode with an output power provided by the power supply device of the first type

S2086

In response to a voltage of the battery unit reaching a cut-off voltage threshold corresponding to a current temperature of the battery unit, cutting off a communication with the second control module and controlling the battery unit to be charged in a second charging mode

S2088

Causing the power supply device of the first type to adjust a maximum output current according to the current temperature of the battery unit

FIG. 5

DEVICE TO BE CHARGED COMPATIBLE WITH MULTIPLE CHARGING SOLUTIONS, AND CHARGING METHOD THEREFOR

CROSS-REFERENCE TO RELATED APPLICATION(S)

This application is a continuation of International (PCT) Patent Application No. PCT/CN2020/120932, filed on Oct. 14, 2020, which claims priority of Chinese Patent Application No. 201910984920.4, filed on Oct. 16, 2019, the entire contents of both of which are incorporated herein by reference.

TECHNICAL FIELD

The present disclosure relates to the field of charging technologies, and in particular, to a device to be charged and a charging method.

BACKGROUND

Devices to be charged (for example, smart phone, mobile terminal, or smart device) are more and more popular with consumers, but these devices to be charged consume a large amount of power and need to be charged frequently. It usually takes several hours to charge these devices to be charged using low-power normal charging schemes. In order to meet this challenge, on the basis of normal charging, the industry has successively proposed high-current charging schemes for single-cell architecture and high-current charging schemes using two cells in series.

How to implement multiple charging schemes (including normal charging schemes and various fast charging schemes) in a same device to be charged, and increase the scalability and adaptability of the device to be charged, has become a technical problem that needs to be solved.

The above information disclosed in the background section is only intended to enhance the understanding of the background of the present disclosure, and therefore it may include information that does not constitute the prior art known to those skilled in the art.

SUMMARY

The present disclosure provides a to-be-charged device and a charging method.

In an aspect, the present disclosure provides a to-be-charged device, comprising: a charging interface; a battery unit; a first charging circuit, connected to the charging interface and the battery unit; and a control module, connected to the charging interface and configured to: identify a type of a power supply device connected to the to-be-charged device through the charging interface; in response to the type of the power supply device being a first type, control the battery unit to be charged in a first charging mode through the first charging circuit; and in response to the type of the power supply device being a second type, control the battery unit to be charged in a second charging mode through the first charging circuit; wherein a maximum output power of the power supply device of the first type is greater than a maximum output power of the power supply device of the second type; a maximum charging current of the battery unit in the first charging mode is greater than a maximum charging current of the battery unit in the second charging mode.

In another aspect, the present disclosure provides a charging method for a to-be-charged device, comprising: identifying a type of a power supply device connected to the to-be-charged device through a charging interface of the to-be-charged device; in response to the type of the power supply device being a first type, controlling the battery unit to be charged in a first charging mode through the first charging circuit; and in response to the type of the power supply device being a second type, controlling the battery unit to be charged in a second charging mode through the first charging circuit; wherein a maximum output power of the power supply device of the first type is greater than a maximum output power of the power supply device of the second type; a maximum charging current of the battery unit in the first charging mode is greater than a maximum charging current of the battery unit in the second charging mode.

It should be understood that the above general description and the later detailed descriptions are exemplary only and do not limit the present disclosure.

BRIEF DESCRIPTION OF DRAWINGS

By describing exemplary embodiments in detail with reference to the accompanying drawings, the above and other objectives, features, and advantages of the present disclosure will become more apparent.

FIG. 3 is a flowchart of a charging method according to an embodiment of the present disclosure.

FIG. 4 is a flowchart of a charging method according to another embodiment of the present disclosure.

FIG. 5 is a flowchart of a charging method according to further another embodiment of the present disclosure.

DETAILED DESCRIPTION

Figure 1:
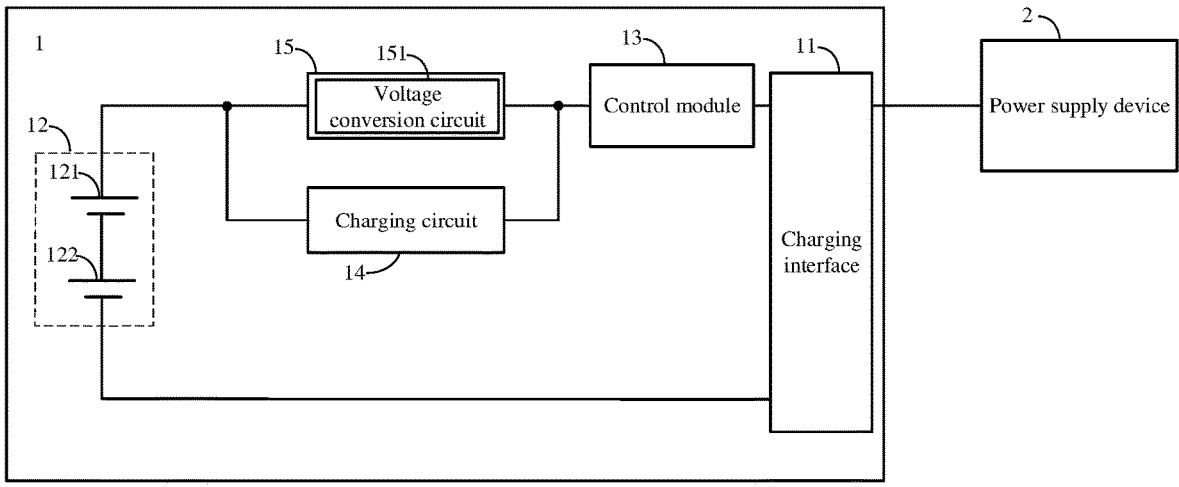
FIG. 1 is a block view of a to-be-charged device according to an embodiment of the present disclosure.

Example embodiments will be described more fully with reference to the accompanying drawings. However, the example embodiments can be implemented in various forms, and should not be construed as being limited to the examples set forth herein. On the contrary, the provision of these embodiments makes the present disclosure more comprehensive and complete, and fully conveys the concept of the embodiments to those skilled in the art. The drawings are only schematic illustrations of the present disclosure, and are not necessarily drawn to scale. The same reference numerals in the figures denote the same or similar parts, and thus their repeated description will be omitted.

In addition, the described features, structures, or characteristics can be combined in one or more embodiments in any suitable manner. In the following description, many specific details are provided to give a sufficient understanding of the embodiments of the present disclosure. However, those skilled in the art will realize that the technical solutions of the present disclosure can be practiced without one or more of the specific details, or other methods, components, devices, steps, etc. can be used. In other instances, no well-known structures, methods, devices, implementations, or operations are shown or described in detail to avoid obscuring aspects of the present disclosure by overwhelming them.

In the present disclosure, unless otherwise clearly defined and defined, the terms "connect", "couple", and other terms should be understood in a broad sense. For example, they may be a fixed connection, a removable connection, or may also be in one piece; they may be a mechanical connection, an electrical connection, or a communication connection; they may be a direct connection, or an indirect connection through an intermediate medium, or a connection within two components or an interaction relationship between two components. To those skilled in the art, the specific meaning of the above terms in the present disclosure may be understood on a case-by-case basis.

In addition, in the description of the present disclosure, the terms "first" and "second" are only intended for descriptive purposes, and cannot be understood as indicating or implying relative importance or implicitly indicating the number of indicated technical features. Thus, the features defined with "first" and "second" may explicitly or implicitly include one or more of these features.

Before introducing the embodiments of the present disclosure, "normal charging mode" and "fast charging mode" in a charging system will be described first.

The normal charging mode means that am adapter outputs a relatively small current value (usually less than 2.5 A) or uses a relatively small power (usually less than 15 W) to charge a battery in a to-be-charged device. In the normal charging mode, it usually takes several hours to fully charge a large capacity battery (such as a 3000 mAh capacity battery).

The fast charging mode means that the adapter can output a relatively large current (usually greater than 2.5 A, such as 4.5 A, 5 A or even higher) or relatively large power (usually greater than or equal to 15 W) to charge the battery in the to-be-charged device.

Compared with the normal charging mode, the charging speed of the adapter in the fast charging mode is faster, and the charging time required to fully charge the battery of the same capacity can be significantly shortened.

During the charging process, a power supply device (such as power adapter, power bank, and other equipments) is generally connected to the to-be-charged device through a cable, and the power provided by the power supply device is transmitted to the to-be-charged device through the cable for charging the to-be-charged device.

The power supply device may be a normal-type adapter, for example, a power adapter with a maximum output power of 10 W (5V/2 A) that uses the above-mentioned normal charging mode to charge the to-be-charged device; alternatively, the power supply device may be a third-type fast charging adapter, for example, a high power adapter with a maximum output power of 50 W (10V/5 A), charging the to-be-charged device using the fast charging mode described above; alternatively, the power supply unit may be a first-type fast charging adapter, for example a high power adapter of 20 W (5V/4 A), charging the to-be-charged device using the fast charging mode described above.

In the related art, for a to-be-charged device with two batteries connected in series, when the to-be-charged device is connected to the third-type fast charging adapter for charging, in hardware, the battery in the to-be-charged device is quickly charged through a second charging circuit. When there is a problem with fast charging, or when the battery is fully charged with the fast charging, the second charging circuit is usually closed and the battery is normally charged through a first charging circuit. When the to-be-charged device is connected to the normal-type adapter for charging, the battery is directly charged through the first charging circuit. When the to-be-charged device is connected to the first-type fast charging adapter, a fast charging module logic cannot be performed, and the first-type fast charging adapter can only be used as a normal charging adapter to charge the battery in the normal mode.

FIG. 1 is a block view of a to-be-charged device according to an embodiment of the present disclosure.

The to-be-charged device 1 shown in FIG. 1 may be, for example, a terminal or a communication terminal. The terminal or communication terminal may be connected via a wired line, such as via public switched telephone network (PSTN), digital subscriber line (DSL), digital cable, direct cable connection, and/or another data connection/network, and/or via, for example, cellular network, wireless local area network (WLAN), digital television network such as digital video broadcasting (DVB-H) network, satellite network, amplitude modulation-frequency modulation (AM-FM) broadcast transmitter, and/or a device for receiving/transmitting communication signals at the wireless interface of another communication terminal. The communication terminal configured to communicate through a wireless interface may be referred to as a "wireless communication terminal", a "wireless terminal" and/or a "mobile terminal". Examples of the mobile terminals include, but are not limited to satellite or cellular phones; personal communication system (PCS) terminals that can combine cellular radio phones with data processing, fax, and data communication capabilities; personal digital assistant (PDA) that may include a radio phone, pager, Internet/Intranet access, Web browser, notepad, calendar, and/or global positioning system (GPS) receiver; and conventional lap-top and/or handheld receivers or other electronic devices that include radiotelephone transceivers. In addition, the terminal may also include, but is not limited to, rechargeable electronic devices with charging capabilities, such as electronic book reader, smart wearable devices, mobile power source (such as power bank, travel charger), electronic cigarette, wireless mouse, wireless keyboard, wireless headset, Bluetooth speaker, etc.

Referring to FIG. 1, the to-be-charged device 1 includes: a charging interface 11, a battery unit 12, a control module 13, a charging circuit 14, and a charging circuit 15.

The to-be-charged device 1 is connected to a power supply device 2 through the charging interface 11 to charge the battery unit 12.

The charging interface 11 may be, for example, a USB 2.0 interface, a Micro USB interface, or a USB TYPE-C interface. In some embodiments, the charging interface 11 may also be a lightning interface, or any other type of parallel port or serial port that can be used for charging.

The battery unit 12 may be, for example, a lithium battery including two battery cells connected in series. Alternatively, the battery unit 12 may also include two battery units connected in series, and each battery unit is a lithium battery including a single battery cell or a plurality of battery cells. In FIG. 1, the battery unit 12 includes two battery units connected in series as an example. As shown in FIG. 1, the battery unit 12 includes: a first battery unit 121 and a second battery unit 122 connected in series as an example.

In the following, the battery unit 12 including two battery units connected in series with each battery unit containing a single cell is taken as an example, to illustrate how the use of multiple series-connected battery units can both increase the charging speed and reduce the heat generation of the to-be-charged device when charging at high currents.

For a to-be-charged device that includes a single battery unit, when a larger charging current is used to charge the single battery unit, the heating phenomenon of the to-be-charged device will be more serious. In order to ensure the charging speed of the to-be-charged device and alleviate the heating phenomenon of the to-be-charged device during the charging process, the battery structure may be modified to use multiple battery units connected in series and directly charge the multiple battery units, that is, to directly load the voltage output by the adapter to two ends of the multiple battery units. Compared with the single battery unit solution (that is, the capacity of the single battery unit before the improvement is considered to be the same as the total capacity of multiple battery units connected in series after the improvement), if the same charging speed is to be achieved, the charging current required for the multiple battery units is about 1/N of the charging current required for the single battery unit (N is the number of battery units connected in series). In other words, under the premise of ensuring the same charging speed, the multiple battery units in series can greatly reduce the charging current, which further reduces the amount of heat generated by the to-be-charged device during the charging process. Therefore, in order to increase the charging speed and reduce the heat generation of the to-be-charged device during the charging process, the to-be-charged device may be adopted with multiple battery units connected in series.

The charging circuit 14 is connected to the charging interface 11 and the battery unit 12, and is configured to provide a charging path between the charging interface 11 and the battery unit 12 when the type of the power supply device 2 is a third type (e.g., the above-mentioned third-type fast charging adapter), thereby providing the output power of the power supply device 2 of the third type to the battery unit 12.

The charging circuit 15 is connected to the charging interface 11 and the battery unit 12, and is configured to provide a charging path between the charging interface 11 and the battery unit 12 when the type of the power supply device 2 is a second type (e.g., the above-mentioned normal-type adapter), thereby providing the output power of this power supply device 2 of the second type to the battery unit 12.

In order to be compatible with the power supply device 2 of the first type (such as the above-mentioned first-type fast charging adapter), the charging circuit 15 is also configured to provide a charging path between the charging interface 11 and the battery unit 12 when the type of the power supply device 2 is a first type, thereby providing the output power of this power supply device 2 of the first type to the battery unit 12.

In addition, the charging circuit 15 includes a voltage conversion circuit 151 (for example, a Boost circuit) for boosting the voltage provided by the first or power supply device 2 of the second type to charge the battery unit 12 having two series-connected battery cells or the battery unit 12 including two series-connected battery units.

The control module 13 is configured to identify different types of the power supply device 2. When it is identified that the type of the power supply device 2 is the third type, the battery unit 12 is controlled to be charged through the charging circuit 14. When it is identified that the type of the power supply device 2 is the first type, the battery unit 12 is charged in the first charging mode through the charging circuit 15. When it is identified that the type of the power supply device 2 is the second type, the battery unit 12 is charged in the second charging mode through the charging circuit 15.

The maximum charging current of the battery unit 12 in the first charging mode is greater than the maximum charging current of the battery unit 12 in the second charging mode. The first charging mode is, for example, the fast charging mode when the input power is provided by the power supply device of the first type, and the second charging mode is the normal charging mode as described above.

The control module 13 may be implemented by, for example, an independent micro control unit (MCU), or may also be implemented by an application processor (AP) of the to-be-charged device 1.

According to the to-be-charged device provided by the embodiments of the present disclosure, the type of the power supply device connected to the to-be-charged device may be identified first through the control module, and after the first-type fast charging adapter or the normal-type adapter is identified, the battery is controlled to be charged through the first charging circuit which shares the normal charging mode, thereby realizing rapid charging of the battery unit through the charging control of the control module. The to-be-charged device may be compatible with multiple charging schemes, which enhances the scalability and adaptability of the to-be-charged device, and also improves the charging experience of users. Further, the to-be-charged device may also control the battery unit to be charged through the second charging circuit after identifying that the type of the power supply device is the third-type fast charging adapter.

It should be clearly understood that the present disclosure describes how to form and use specific examples, but the principles of the present disclosure are not limited to any details of these examples. On the contrary, based on the teaching of the contents of the present disclosure, these principles can be applied to many other embodiments.

Figure 2:
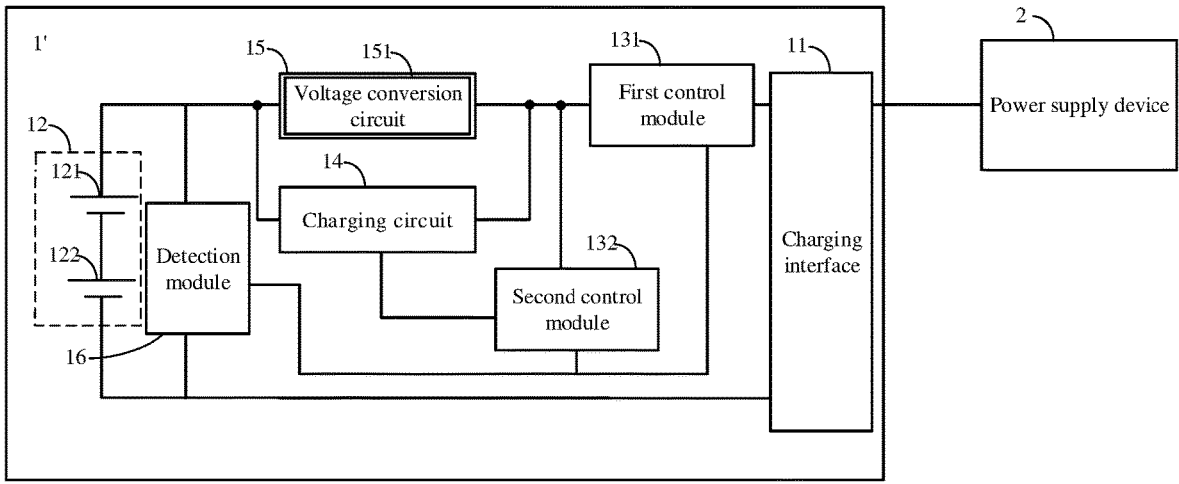
FIG. 2 is a block view of a to-be-charged device according to another embodiment of the present disclosure.

FIG. 2 is a block view of a to-be-charged device according to another embodiment of the present disclosure. The difference from the to-be-charged device 1 shown in FIG. 1 is that the control module 13 in the to-be-charged device 1' shown in FIG. 2 may further include a first control module 131 and a second control module 132.

The first control module 131 may be, for example, an application processor in the to-be-charged device 1'. The first control module 131 is configured to identify whether a connection port provided by the power supply device 2 is a dedicated charging port (DCP), which does not support data transmission and can provide a charging current of more than 1.5 A. There is a short circuit between D+ and D− lines of the port. This type of port can support chargers with higher charging capabilities and car chargers. Specifically, after the power supply device 2 is connected to the to-be-charged device 1' through a cable, the first control module 131 identifies whether the connection port provided by the power supply device 2 is a DCP through a BC2.1 protocol. The BC2.1 is a USB charging specification, which regulates detection, control and reporting mechanisms of the device charging through the USB port. The BC2.1 protocol is well known by those skilled in the art, and in order to avoid obscuring the present disclosure, it will not be repeated here.

When the first control module 131 identifies that the port provided by the power supply device 2 is a dedicated charging port, it can start the charging thread for the above-mentioned normal charging mode, and perform a corresponding charging parameter setting of the normal charging mode, including the input current, cutoff current, etc. set for the purpose of input current adaption. In addition, the first control module 131 also informs the second control module 132 to identify the type of the power supply device by toggling D+/D−.

The second control module 132 may be, for example, an MCU for fast charging control, which is connected to the first control module 131. When the first control module 131 identifies that the port provided by the power supply device is a dedicated charging port, the second control module 132 further identifies the type of power supply device 2. For example, the data line D+/D− may be used for identification. For example, different preset communication levels may be loaded on D+/D− to identify the type of the power supply device 2, such as identifying whether it is the above-mentioned third type or first type.

When the second control module 132 identifies that the type of the power supply device 2 is the third type, the battery unit 12 is controlled to be charged through the charging circuit 14.

The first control module 131 is also configured to control the battery unit 12 to be charged through the charging circuit 15 when it is identified that the port provided by the power supply device is a dedicated charging port, and the second control module 132 identifies that the type of the power supply device is not the third type.

For example, when the second control module 132 identifies that the type of the power supply device 2 is the first type, it informs the first control module 131 through the connection with the first control module 131, and the first control module 131 controls the battery unit 12 to be charged through the charging circuit 15. When the second control module 132 identifies that the type of the power supply device 2 is neither the third type nor the first type, the first control module 131 also controls the battery unit 12 to be charged through the charging circuit 15.

That is, as described above, when the power supply device 2 of the first type or the power supply device 2 of the second type charges the to-be-charged device 1', the two types share the same hardware charging path.

In addition, the first control module 131 further provides corresponding charging logic control for the battery unit 12 charged by the power supply device 2 of the first type.

For example, the first control module 131 may learn that the type of the power supply device 2 is the first type, and set a parameter value of the charging parameter for the to-be-charged device 1'. The charging parameter corresponds to different parameter values in different battery temperature ranges.

For example, the charging parameter may include at least one of: an input current parameter configured to limit the maximum output current of the power supply device 2, a charging current parameter configured to limit the maximum current input to the battery unit 12, a cut-off current parameter configured to determine whether the battery unit 12 is fully charged, and a cut-off voltage parameter configured to determine whether the battery unit 12 is fully charged under fast charging, etc.

When the type of the power supply device 2 is the first type, the first control module 131 may further be configured to provide the following charging control logic:

For example, in a case that the first control module 131 controls the battery unit 12 to be charged in the first charging mode through the output power provided by the power supply device 2 of the first type, when it is determined that the voltage of the battery unit 12 reaches a voltage cutoff threshold corresponding to a current temperature of the battery unit 12 (for example, a voltage cutoff threshold set based on the cut-off voltage parameter), the communication with the second control module 132 is cut off, and the battery unit 12 is controlled to be charged in the second charging mode. The output power provided by the power supply device 2 of the first type in the first charging mode is greater than the output power provided in the second charging mode. The second charging mode is, for example, the above-mentioned normal charging mode. That is, even if the type of the connected power supply device 2 is first type, the power supply device 2 may provide a fast charging mode (such as the first charging mode) and also provide a normal charging mode (such as the second charging mode).

In addition, the first control module 131 controls the battery unit 12 to be charged at a constant voltage when the battery unit 12 is charged in the second charging mode. When the charging current of the battery unit is less than the cut-off current threshold within a preset time (for example, a cut-off current threshold set based on the above-mentioned cut-off current parameter), it is determined that the battery unit 12 is fully charged.

In the normal charging mode, the battery charging process may include: a trickle charging phase (or mode), a constant current charging phase (or mode), and a constant voltage charging phase (or mode). In the trickle charging phase, the fully discharged battery is pre-charged (i.e., restorative charging), and the trickle charging current is usually one-tenth of the constant current charging current. When the battery voltage rises above a trickle charging voltage threshold, the charging current is increased to enter the constant current charging phase. In the constant current charging phase, the battery is charged with a constant current, and the charging voltage rises rapidly. When the charging voltage reaches an expected charging voltage threshold of the battery, the battery charging process switches to the constant voltage charging phase. In the voltage charging phrase, the battery is charged at a constant voltage, and the charging current gradually decreases. When the charging current drops to a set current threshold (the current threshold is typically a tenth or less of the value of the charging current during the constant current charging phase; alternatively, the current threshold may be tens of milliamps or less), the battery is fully charged.

When the first control module 131 controls the battery unit 12 to be charged in the first charging mode, and detects that the battery unit 12 is fully charged in the first charging mode (that is, fully charged in the fast charging mode), it enters the normal charging mode (second charging mode) for charging. At this time, the battery unit 12 enters the constant voltage charging phrase in the normal charging mode, that is, continues to be charged at a constant voltage until fully charged.

In other embodiments, the time required to charge directly using the constant voltage charging phrase is longer due to a high float of the voltage at full charge (i.e., the battery voltage is falsely high) when performing a high-current fast charge. In order to shorten the charging time of the constant voltage charging phrase, it is also possible to continue to charge the battery unit 12 with a larger constant current in the second charging mode, that is, continue to perform the constant current charging phrase in the normal charging mode. When the charging current in the constant current charging phase cannot be maintained, the charging process is switched to the constant voltage charging phase until the battery unit 12 is fully charged.

In addition, the first control module 131 may further configured to enable the power supply device 2 of the first type to adjust the maximum output current according to the current temperature of the battery unit 12. For example, when the battery unit 12 is charged with the maximum output current corresponding to a first battery temperature range (for example, 35° C. to 37° C.), the temperature of the battery unit 12 gradually increases and is higher than the first battery temperature range. The changed temperature, for example, falls within a second battery temperature range (greater than 37° C.), and the first control module 131 communicates with the power supply device 2 to inform the power supply device 2 to adjust the maximum output current to the maximum output current corresponding to the second battery temperature range. When the temperature of the battery unit 12 is lower than the second battery temperature range, if the maximum output current of the power supply device 2 is adjusted still according to whether the current temperature of the battery unit 12 falls within the first battery temperature range, the adjustment process will keep repeating and the temperature rise of the battery unit 12 will not be controlled effectively. In order to prevent the occurrence of such jitter, a third battery temperature range may be configured to determine whether to adjust the maximum output current. The upper limit of the third battery temperature range is, for example, the upper limit of the first battery temperature range minus a temperature threshold (for example, it can be set to 1° C.). That is, when the current battery temperature of the battery unit 12 falls within the third battery temperature range (for example, 35° C. to 36° C.), the power supply device 2 is informed to adjust the maximum output current to the maximum output current corresponding to the third battery temperature range. The third battery temperature range may correspond to the same maximum output current as the first battery temperature range does.

Similarly, when the battery unit 12 is charged with the maximum output current corresponding to the first battery temperature range (for example, 35° C. to 37° C.), the temperature of the battery unit 12 gradually decreases and is lower than the first battery temperature range. The changed temperature, for example, falls within a fourth battery temperature range (for example, 12° C. to 35° C.), and the first control module 131 communicates with the power supply device 2 to inform the power supply device 2 to adjust the maximum output current to the maximum output current corresponding to the fourth battery temperature range. When the temperature of the battery unit 12 is higher than the fourth battery temperature range, if the maximum output current of the power supply device 2 is adjusted still according to whether the current temperature of the battery unit 12 falls within the first battery temperature range, the adjustment process will keep repeating and the temperature rise of the battery unit 12 will not be controlled effectively. In order to prevent the occurrence of such jitter, a fifth battery temperature range may be configured to determine whether to adjust the maximum output current. For example, the lower limit of the fifth battery temperature range is the lower limit of the first battery temperature range plus a temperature threshold (for example, it can be set to 1° C.). That is, when the current battery temperature of the battery unit 12 falls within the fifth battery temperature range (for example, 36° C. to 37° C.), the power supply device 2 is informed to adjust the maximum output current to the maximum output current corresponding to the fifth battery temperature range. The fifth battery temperature range may correspond to the same maximum output current as the first battery temperature range does.

In addition, the maximum output current has different parameter values corresponding to the same battery temperature range when the to-be-charged device 1' performs on-screen charging and off-screen charging.

In addition, the to-be-charged device 1' may further include a detection module 16 for detecting the temperature, voltage, and charging current of the battery unit 12.

According to the to-be-charged device provided by the embodiments of the present disclosure, a software control solution compatible with the power supply device of the first type is further provided. After the second control module identifies the power supply device of the first type, the first control module implements the control of the charging logic of the fast charging in the first charging mode. Therefore, the to-be-charged device that supports multiple battery cells may also be charged with high power when the power supply device of the first type is used for charging.

It should be noted that the block views shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices.

The following are embodiments of the method of the present disclosure, which can be applied to the device in the embodiments of the present disclosure. For details that are not disclosed in the method embodiments of the present disclosure, reference may be made to the device embodiments of the present disclosure.

FIG. 3 is a flowchart of a charging method according to an embodiment of the present disclosure. The charging method 10 shown in FIG. 3 may be applied to the to-be-charged device 1 as described above.

Referring to FIG. 3, the charging method 10 includes operations at blocks as followed.

At block S102: identifying a type of a power supply device connected to the to-be-charged device through a charging interface of the to-be-charged device.

At block S104: in response to the type of the power supply device being a first type, controlling a battery unit to be charged in a first charging mode through a first charging circuit.

At block S106: in response to the type of the power supply device being a second type, controlling the battery unit to be charged in a second charging mode through the first charging circuit.

In some embodiments, the method may further include:

At block S108: in response to the type of the power supply device being a third type, controlling the battery unit of the to-be-charged device to be charged through a second charging circuit of the to-be-charged device.

The maximum output power of the power supply device of the third type is greater than the maximum output power of the power supply device of the first type, and the maximum output power of the power supply device of the first type is greater than the maximum output power of the power supply device of the second type.

The maximum charging current of the battery unit in the first charging mode is greater than the maximum charging current in the second charging mode.

According to the charging method provided by the embodiments of the present disclosure, the type of the power supply device connected to the control module may be identified first through the control module. After the power supply device is identified as a first-type fast charging adapter or a normal-type adapter, the first charging circuit of the normal charging mode can be shared to control the battery for charging, and the fast charging of the battery unit may be realized through the charging control of the control module. The to-be-charged device can be compatible with multiple charging schemes, enhancing the scalability and adaptability of the to-be-charged device, and also improving the charging experience of the user. Further, the charging method can also control the battery unit to be charged through the second charging circuit after identifying the power supply device as a third-type fast charging adapter.

FIG. 4 is a flowchart of a charging method according to another embodiment of the present disclosure. The charging method 20 shown in FIG. 4 may be applied to the to-be-charged device 1' as described above.

Referring to FIG. 4, the charging method 20 includes operations at blocks as followed.

At block S202: identifying whether a connection port provided by a power supply device is a dedicated charging port through a first control module of the to-be-charged device.

At block S204: in response to the connection port provided by the power supply device being a dedicated charging port, identifying a type of the power supply device through a second control module of the to-be-charged device.

At block S206: in response to the type of the power supply device being a third type, controlling, by the second control module, a battery unit of the to-be-charged device to be charged through a second charging circuit of the to-be-charged device.

At block S208: in response to the type of the power supply device being a first type, controlling, by the first control module, the battery unit to be charged in a first charging mode through a first charging circuit.

FIG. 5 is a flowchart of a charging method according to further another embodiment of the present disclosure. As shown in FIG. 5, FIG. 5 further provides an embodiment of how the first control module controls the battery unit to be charged in the first charging mode through the first charging circuit.

Referring to FIG. 5, step S208 include operations at blocks as followed.

At block S2082: setting a parameter value of a charging parameter for the to-be-charged device.

The charging parameter corresponds to different parameter values in different battery temperature ranges.

In some embodiments, step S208 may further include operations at blocks as followed.

At block S2084: controlling the battery unit to be charged in the first charging mode with an output power provided by the power supply device of the first type.

At block S2086: in response to a voltage of the battery unit reaching a cut-off voltage threshold corresponding to a current temperature of the battery unit, cutting off a communication with the second control module and controlling the battery unit to be charged in a second charging mode.

In some embodiments, the controlling the battery unit to be charged in the second charging mode includes: controlling the battery unit to be charged at a constant voltage; and in response to a charging current of the battery unit being less than a cut-off current threshold within a preset time, determining that the battery unit is fully charged.

In some embodiments, the controlling the battery unit to be charged in the second charging mode may further include: before the controlling the battery unit to be charged at a constant voltage, controlling the battery unit to be charged with a constant current in the second charging mode.

In some embodiments, as shown in FIG. 5, step S208 may further include operations at blocks as followed.

At block S2088: causing the power supply device of the first type to adjust a maximum output current according to the current temperature of the battery unit.

In some embodiments, the causing the power supply device of the first type to adjust the maximum output current according to the current temperature of the battery unit may include: in response to the battery unit being charged with the maximum output current corresponding to a first battery temperature range, and in response to a temperature of the battery unit being higher than the first battery temperature range, charging the battery unit with the maximum output current corresponding to a second battery temperature range within which a changed temperature of the battery unit is; and in response to the temperature of the battery unit being lower than the second battery temperature range and within a third battery temperature range, charging the battery unit with the maximum output current corresponding to the third battery temperature range; wherein an upper limit of the third battery temperature range is an upper limit of the first battery temperature range minus a temperature threshold, and the first battery temperature range corresponds to the same maximum output current as the third battery temperature range does.

In some embodiments, the causing the power supply device of the first type to adjust the maximum output current according to the current temperature of the battery unit may further include: in response to the battery unit being charged with the maximum output current corresponding to the first battery temperature range, and in response to the temperature of the battery unit being lower than the first battery temperature range, charging the battery unit with the maximum output current corresponding to a fourth battery temperature range within which the changed temperature of the battery unit is; and in response to the temperature of the battery unit being higher than the fourth battery temperature range and being within a fifth battery temperature range, charging the battery unit with the maximum output current corresponding to the fifth battery temperature range; wherein a lower limit of the fifth battery temperature range is a lower limit of the first battery temperature range plus a temperature threshold, and the first battery temperature range corresponds to the same maximum output current as the fifth battery temperature range does.

In some embodiments, the maximum output current has different parameter values corresponding to the same battery temperature range when the to-be-charged device is performing on-screen charging and performing off-screen charging.

At block S210: in response to the type of the power supply device being neither the third type nor the first type, controlling, by the first control module, the battery unit to be charged in a second charging mode through the first charging circuit.

The maximum output power of the power supply device of the third type is greater than the maximum output power of the power supply device of the first type, and the maximum output power of the power supply device of the first type is greater than the maximum output power of the power supply device of the second type.

The maximum charging current of the battery unit in the first charging mode is greater than the maximum charging current in the second charging mode.

According to the charging method provided by the embodiments of the present disclosure, a software control solution compatible with the power supply device of the first type is further provided. After the second control module identifies the power supply device of the first type, the first control module implements the control of the charging logic of the fast charging in the first charging mode. Therefore, the to-be-charged device that supports multiple battery cells can also be charged with high power when the power supply device of the first type is used for charging.

Figure 6:
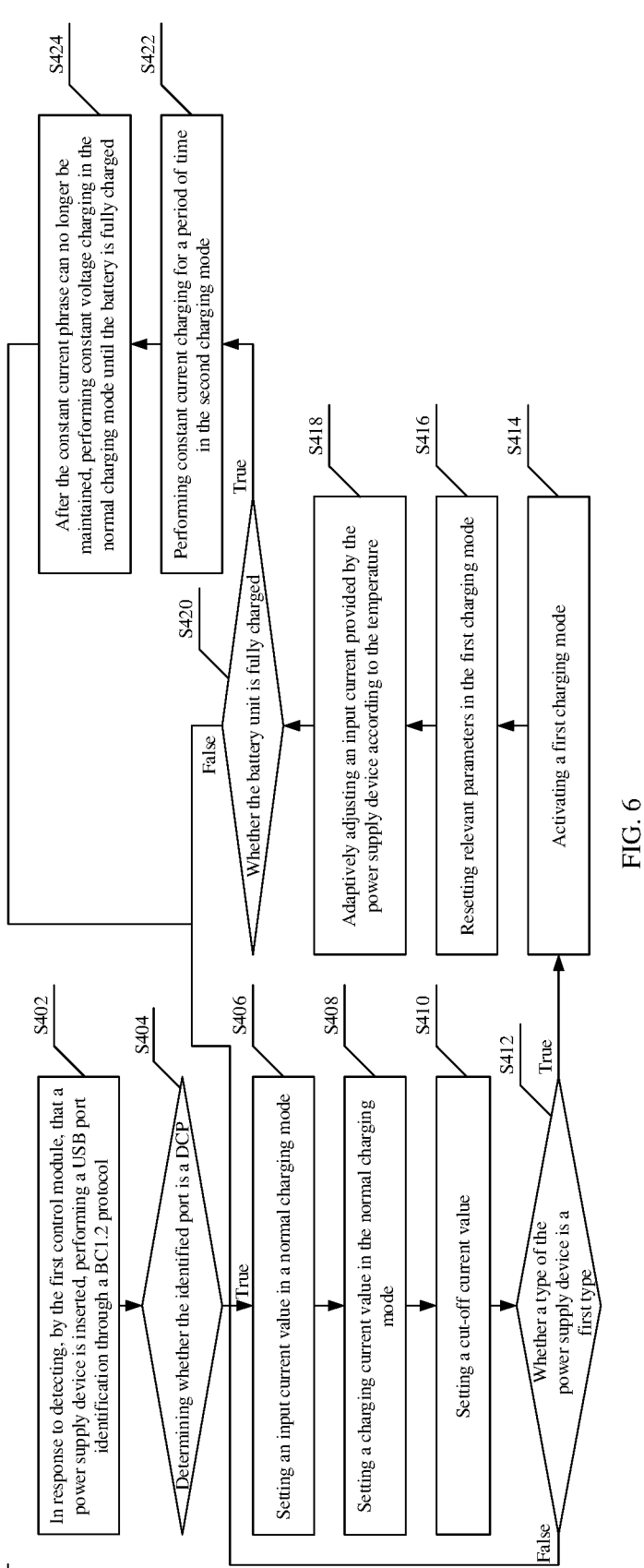
FIG. 6 is a flowchart of a charging method according to further another embodiment of the present disclosure.

FIG. 6 is a flowchart of a charging method according to further another embodiment of the present disclosure. The charging method 40 shown in FIG. 6 may be applied to the to-be-charged device 1' as described above.

Referring to FIG. 6, the method includes: in response to detecting, by the first control module, that a power supply device is inserted, performing a USB port identification through a BC1.2 protocol (at block S402); determining whether the identified port is a DCP (at block S404); in response to the identified port being a DCP, performing step S406 to set an input current value in a normal charging mode, the input current value being configured to limit a maximum output current of the power supply device; setting a charging current value in the normal charging mode, the charging current value being configured to limit a maximum charging current loaded to the battery unit (at block S408), wherein the input current value and the charging current value cooperatively determine a charging process, and a magnitude of a charging current loaded to the battery unit cannot exceed a minimum of the input current value and the charging current value; setting a cut-off current value (at block S410), the cut-off current value being configured to determine whether the battery unit is fully charged, wherein in response to a voltage of the battery unit being higher than a voltage threshold for determining full charge, and in response to a current entering the battery unit being less than the cut-off current value for a preset period of time, it is determined that the battery unit is fully charged; receiving, by the first control module, an identification result of the second control module for determining whether a type of the power supply device is a first type (at block S412); in response to the type of the power supply device being the first type, performing step S414 to activate a first charging mode; in response to the type of the power supply device not being the first type, performing step S406 to reset relevant parameters in the first charging mode (at block S416), namely adaptively resetting the input current value, charging current value, cut-off current value, etc. according to the detected temperature of the battery unit; in the first charging mode, adaptively adjusting an input current provided by the power supply device according to the temperature (at block S418); detecting whether the battery unit is fully charged in the first charging mode (at block S420), of which the specific detection method is as described above and will not be repeated here; in response to the battery unit being fully charged, performing constant current charging for a period of time in the second charging mode (at block S422); after the constant current phrase can no longer be maintained, performing constant voltage charging in the normal charging mode until the battery is fully charged (at block S424); and in response to the battery being not fully charged, returning to step S406, and adaptively resetting the current-related parameter values according to the detected current battery temperature.

It should be noted that the above-mentioned drawings are only schematic illustrations of the processing included in the method according to the exemplary embodiments of the present disclosure, and are not intended for limitation. That is, it is not required or implied that these steps must be performed in the specific order, or that all the steps shown must be performed to achieve the desired result. Additionally or alternatively, some steps may be omitted, multiple steps may be combined into one step for execution, and/or one step may be decomposed into multiple steps for execution, etc. In addition, these processes can also be executed synchronously or asynchronously in multiple modules.

The exemplary embodiments of the present disclosure have been specifically shown and described above. It should be understood that the present disclosure is not limited to the detailed structure, arrangement or implementation method described herein; on the contrary, the present disclosure intends to cover various modifications and equivalent arrangements included in the spirit and scope of the appended claims.

What is claimed is:

1. A to-be-charged device, comprising:
a charging interface;
a battery unit, wherein the to-be-charged device is configured to be connected to a power adapter through the charging interface to charge the battery unit;
a first charging circuit, connected to the charging interface and the battery unit; and
a control module, connected to the charging interface and configured to: identify a type of the power adapter connected to the to-be-charged device; in response to the type of the power adapter being a first type, control the battery unit to be charged in a first charging mode through the first charging circuit; and in response to the type of the power adapter being a second type, control the battery unit to be charged in a second charging mode through the first charging circuit;
wherein a maximum output power of the power adapter of the first type is greater than a maximum output power of the power adapter of the second type;
a maximum charging current of the battery unit in the first charging mode is greater than a maximum charging current of the battery unit in the second charging mode.

2. The to-be-charged device according to claim 1, further comprising a second charging circuit, connected to the charging interface and the battery unit; wherein the control module is further configured to: in response to the type of the power adapter being a third type, control the battery unit to be charged through the second charging circuit; a maximum output power of the power adapter of the third type is greater than the maximum output power of the power adapter of the first type.

3. The to-be-charged device according to claim 2, wherein the control module comprises:
a first control module, connected to the charging interface and configured to identify whether a connection port provided by the power adapter is a dedicated charging port; and
a second control module, connected to the charging interface and the first control module and configured to: in response to the connection port provided by the power adapter being a dedicated charging port, identify the type of the power adapter; and in response to the type of the power adapter being the third type, control the battery unit to be charged through the second charging circuit;
wherein the first control module is further configured to: in response to the type of the power adapter being the first type, control the battery unit to be charged in the first charging mode through the first charging circuit; and in response to the type of the power adapter being neither the third type nor the first type, control the battery unit to be charged in the second charging mode through the first charging circuit.

4. The to-be-charged device according to claim 3, wherein the first control module is further configured to: in response to the type of the power adapter being the first type, set a parameter value of a charging parameter for the to-be-charged device; wherein the charging parameter corresponds to different parameter values in different battery temperature ranges.

5. The to-be-charged device according to claim 4, wherein the first control module is further configured to cause the power adapter of the first type to adjust a maximum output current according to a current temperature of the battery unit.

6. The to-be-charged device according to claim 4, wherein the first control module is further configured to: in response to the battery unit being charged in the first charging mode, and in response to a voltage of the battery unit reaching a cut-off voltage threshold corresponding to a current temperature of the battery unit, cut off a communication with the second control module and control the battery unit to be charged in the second charging mode.

7. The to-be-charged device according to claim 6, wherein the first control module is further configured to: in response to the battery unit being charged in the second charging mode, control the battery unit to be charged at a constant voltage; and in response to a charging current of the battery unit being less than a cut-off current threshold within a preset time, determine that the battery unit is fully charged.

8. The to-be-charged device according to claim 7, wherein the first control module is further configured to: before the controlling the battery unit to be charged at a constant voltage, control the battery unit to be charged with a constant current in the second charging mode.

9. A method for charging a to-be-charged device comprising a charging interface and a battery unit, and configured to be connected to a power adapter through the charging interface to charge the battery unit, the method comprising:

identifying a type of the power adapter connected to the to-be-charged device through the charging interface of the to-be-charged device;

in response to the type of the power adapter being a first type, controlling a battery unit to be charged in a first charging mode through a first charging circuit; and in response to the type of the power adapter being a second type, controlling the battery unit to be charged in a second charging mode through the first charging circuit;

wherein a maximum output power of the power adapter of the first type is greater than a maximum output power of the power adapter of the second type;

a maximum charging current of the battery unit in the first charging mode is greater than a maximum charging current of the battery unit in the second charging mode.

10. The method according to claim 9, further comprising:

in response to the type of the power adapter being a third type, controlling the battery unit to be charged through a second charging circuit of the to-be-charged device;

wherein a maximum output power of the power adapter of the third type is greater than the maximum output power of the power adapter of the first type.

11. The method according to claim 10, wherein the identifying the type of the power adapter connected to the to-be-charged device through the charging interface of the to-be-charged device comprises:

identifying whether a connection port provided by a power adapter is a dedicated charging port through a first control module of the to-be-charged device;

in response to the connection port provided by the power adapter being a dedicated charging port, identifying whether the type of the power adapter is the third type or the first type through a second control module of the to-be-charged device; and in response to the type of the power adapter being neither the third type nor the first type, determining the type of the power adapter is the second type.

12. The method according to claim 11, wherein in response to the second control module detecting that the type of the power adapter is the first type, the controlling, by the first control module, the battery unit to be charged in the first charging mode through the first charging circuit further comprises:

causing the power adapter of the first type to adjust a maximum output current according to a current temperature of the battery unit.

13. The method according to claim 12, wherein the causing the power adapter of the first type to adjust the maximum output current according to the current temperature of the battery unit comprises:

in response to the battery unit being charged with the maximum output current corresponding to a first battery temperature range, and in response to a temperature of the battery unit being higher than the first battery temperature range, charging the battery unit with the maximum output current corresponding to a second battery temperature range within which a changed temperature of the battery unit is; and in response to the temperature of the battery unit being lower than the second battery temperature range and within a third battery temperature range, charging the battery unit with the maximum output current corresponding to the third battery temperature range;

wherein an upper limit of the third battery temperature range is an upper limit of the first battery temperature range minus a temperature threshold, and the first battery temperature range corresponds to a same maximum output current as the third battery temperature range does.

14. The method according to claim 12, wherein the causing the power adapter of the first type to adjust the maximum output current according to the current temperature of the battery unit comprises:

in response to the battery unit being charged with the maximum output current corresponding to a first battery temperature range, and in response to a temperature of the battery unit being lower than the first battery temperature range, charging the battery unit with the maximum output current corresponding to a fourth battery temperature range within which a changed temperature of the battery unit is; and in response to the temperature of the battery unit being higher than the fourth battery temperature range and being within a fifth battery temperature range, charging the battery unit with the maximum output current corresponding to the fifth battery temperature range;

wherein a lower limit of the fifth battery temperature range is a lower limit of the first battery temperature range plus a temperature threshold, and the first battery temperature range corresponds to a same maximum output current as the fifth battery temperature range does.

15. The method according to claim 12, wherein in response to the to-be-charged device performing on-screen charging, the maximum output current has a first parameter value corresponding to a battery temperature range;

in response to the to-be-charged device performing off-screen charging, the maximum output current has a second parameter value corresponding to the battery temperature range; and the first parameter value and the second parameter value are different.

16. The method according to claim 11, wherein the controlling the battery unit to be charged through the second charging circuit of the to-be-charged device comprises: controlling, by the second control module, the battery unit to be charged through the second charging circuit;

the controlling the battery unit to be charged in the first charging mode through the first charging circuit comprises: controlling, by the first control module, the battery unit to be charged in the first charging mode through the first charging circuit; and the controlling the battery unit to be charged in the second charging mode through the first charging circuit comprises: controlling, by the first control module, the battery unit to be charged in the second charging mode through the first charging circuit.

17. The method according to claim 16, wherein in response to the second control module detecting that the type of the power adapter is the first type, the controlling, by the first control module, the battery unit to be charged in the first charging mode through the first charging circuit comprises:

setting a parameter value of a charging parameter for the to-be-charged device;

wherein the charging parameter corresponds to different parameter values in different battery temperature ranges.

18. The method according to claim 17, wherein in response to the second control module detecting that the type of the power adapter is the first type, the controlling, by the first control module, the battery unit to be charged in the first charging mode through the first charging circuit further comprises:

controlling the battery unit to be charged in the first charging mode with an output power provided by the power adapter of the first type; and in response to a voltage of the battery unit reaching a cut-off voltage threshold corresponding to a current temperature of the battery unit, cutting off a communication with the second control module and controlling the battery unit to be charged in the second charging mode.

19. The method according to claim 18, wherein the controlling the battery unit to be charged in the second charging mode comprises:

controlling the battery unit to be charged at a constant voltage; and in response to a charging current of the battery unit being less than a cut-off current threshold within a preset time, determining that the battery unit is fully charged.

20. The method according to claim 19, wherein the controlling the battery unit to be charged in the second charging mode further comprises:

before the controlling the battery unit to be charged at a constant voltage, controlling the battery unit to be charged with a constant current in the second charging mode.

* * * * *